United States Patent
Carrozza et al.

(10) Patent No.: US 6,445,685 B1
(45) Date of Patent: Sep. 3, 2002

(54) UPLINK DEMODULATOR SCHEME FOR A PROCESSING SATELLITE

(75) Inventors: Dominic P. Carrozza, Redondo Beach; Vincent C. Moretti, Torrance; Stuart T. Linsky, San Pedro; David A. Wright, Solana Beach; Gregory S. Caso, Hermosa Beach, all of CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/407,921

(22) Filed: Sep. 29, 1999

(51) Int. Cl.[7] .............................................. H04L 27/233
(52) U.S. Cl. ........................ 370/316; 375/347; 375/340
(58) Field of Search .................................. 370/310, 315, 370/316, 324, 319, 321, 516, 334; 375/347, 340, 341, 326, 371, 354, 362, 373, 376; 455/427, 12.1

(56) References Cited

U.S. PATENT DOCUMENTS 6,236,833 B1 * 5/2001 Peyrovian ................... 455/12.1
6,259,314 B1 * 7/2001 Liu et al. ..................... 375/224
6,279,132 B1 * 8/2001 Linsky et al. ............... 714/755

* cited by examiner

Primary Examiner—Doris H. To
Assistant Examiner—Eliseo Ramos-Feliciano
(74) Attorney, Agent, or Firm—Harness, Dickey & Pierce, P.L.C.

(57) ABSTRACT

An uplink demodulator system (44) for use in a processing satellite (12) in a satellite based communications system (10) is provided with a first multiplexer (62), a second multiplexer (82), a multichannel preamble processor (66), and a multichannel phase tracker (68). The first multiplexer (62) is operable to receive channelized data from a plurality of channelization modes at a plurality of inputs and operable to route the channelized data to a first output. The multichannel preamble processor (66) is operable to determine a phase estimate for each channel of the channelized data. The multichannel phase tracker (68) is operable to receive the phase estimates from the multichannel preamble processor (66) and operable to track a phase for each channel of said channelized data to phase align each channel of said channelized data to corresponding uplink signals. The second multiplexer (82) is operable to multiplex and route heavy encoded channelized data and light encoded channelized data to a second output where the multiplex channelized data is phase aligned with the corresponding uplink signals.

20 Claims, 6 Drawing Sheets

UPLINK DEMODULATOR SCHEME FOR A PROCESSING SATELLITE

BACKGROUND OF THE INVENTION

1. Field of the Invention

This invention relates generally to a communications system and, more particularly, to an uplink demodulator scheme for a processing satellite employed in a satellite based cellular communications system.

2. Discussion of the Related Art

In a satellite based cellular communications system, a central terrestrial control processor or a network control center (NCC) generally controls one or more processing satellites operating within the communications system. Each processing satellite within the communications system services multiple users located in multiple geographic areas, known as ground cells. The processing satellites receive and transmit data signals to and from the multiple users or terrestrial terminals positioned at different locations within the ground cells on a point-to-point manner, via uplinks and downlinks.

Transmission access to the uplinks in each ground cell is typically divided into sub-bands using frequency division multiple access (FDMA). Within each sub-band, the sub-band may again be divided by frequency into multiple channels using FDMA. Transmission access is also divided by time using time division multiple access (TDMA) into slots occupied by a transmission burst. The transmission bursts utilize phase shift keying, usually either binary phase shift keying (BPSK) or quadrature phase shift keying (QPSK) for the modulation format. Typically these transmission bursts have a header that facilitates forming an initial estimate of the carrier phase, and a body which carries the data information which is usually encoded by means of an error control code.

The essential functions of a processing satellite are to separate the various uplink channels by frequency, recover estimates of the modulated data from the burst body, and pass these estimates to error control processing to perform the decoding. In some cases, the data content of the burst takes the form of ATM cells, in which case, it is also necessary to recover the cells from the decoded data and perform integrity checks upon them. These essential functions are performed in three major subsystems in a processing satellite. A channelizer partitions the spectrum of the beam into sub-bands and performs related functions. A demodulator and decoder, which is the subject of the present invention, demodulates and decodes the information provided by the channelizer. Block and cell level processing takes the output from the demodulator and decoder and performs outer decoding and cell level functions.

Each uplink demodulator and decoder is generally required to serve the total bandwidth of a sub-band (typically 17 MHz), of which there are typically seven (7) sub-bands, in each beam of the processing satellite coverage area. Transmission within each sub-band may be configured in one of three modes and the demodulator and decoder must be able to serve each such mode. These modes include type X where the demodulator and decoder handles one single high speed channel at a time, with each channel occupying the full bandwidth of the sub-band. Type Y where the demodulator and decoder handles typically five (5) medium size channels sharing the bandwidth by FDMA. Type Z where the demodulator and decoder concurrently receives signals from typically twenty five (25) narrow band low speed channels sharing the bandwidth again by FDMA. In each of the modes, the data transmission may have a "heavy" or a "light" encoding. In both the heavy and light encoding, an outer error control code is applied, typically a Reed-Solomon code over GF (256) of size (236, 212). In the heavy mode, an inner error control code is also applied. This inner error control code is typically a short rate one-half block code, such as the (8, 4) biorthogonal code. Accordingly, there are six modes which the demodulator and decoder must support which are XH, XL, YH, YL, ZH, ZL.

In each of these encoded modes, the uplink transmission is organized time wise in frames typically of 93 milliseconds, where each frame has two portions. The first portion is the sync burst portion and the second portion is the traffic or data burst portion, typically occupying 3 and 90 milliseconds, respectively. The demodulator and decoder is not required to process the sync burst portion and is only required to process the traffic or data burst portion. The traffic burst portion consists of a number of slots, within which individual traffic bursts may be placed by an uplinking earth terminal. Typically, the number of slots in the ZH mode is 24 and in the ZL mode is 48. In the YH and YL modes, there are typically five times as many slots per frame and in the XH and XL modes, there are typically twenty five time as many slots per frame. The signaling rate is typically 14, 2.8 and 0.56 megasymbols per second in the X, Y and Z channels, respectively. For each channel type the same symbol rate applies for both the heavy code and the light code modes.

The demodulator and decoder must also be capable of examining all the signals present in each burst slot and demodulate and decode it regardless of whether it contains a valid burst. The demodulator and decoder must also function reliably without knowing the phase of the uplink signal. However, the demodulator and decoder may rely on the signal amplitude being substantially controlled as a result of uplink power control methods and may rely upon the incoming frequencies of both the signal carrier and of the symbol epoch clock being very close to its own. The demodulator and decoder may also rely on time alignment of the bursts being very precise so that the demodulator and decoder does not need to provide burst delineation or symbol time recovery functions.

Since ATM protocol requires that cells be delivered in the same order that they are presented and since usage may involve inverse multiplexing where more than one channel is used to transmit a cell frame, the demodulator and decoder must also insure that all bursts are processed in a particular order when channelization is used (i.e., modes Y and Z) and that the burst time order is preserved when heavy and light coding modes are mixed in a given channel mode. In this regard, it should be noted that when in the X mode, only a single channel is present and all bursts are either heavy or light encoded. Conversely, in channels Y and Z, each channel within these modes may be heavy or light encoded.

What is needed then is a demodulator and decoder for a processing satellite in a satellite based cellular communications system that meets the above requirements. This will, in turn, provide a demodulator and decoder for a processing satellite that performs the demodulation process independent of synchronization, eliminates the need for a symbol time recovery based on the reliance on precise synchronization, eliminates the need for burst detection, incorporates phase-lock loop technology, accommodates three channelization modes, accommodates two coding modes, permits mixed coding modes in multichannel modes (Y and Z), and is switchable among multiple operating modes with different channelizations. It is, therefore, an object of the present invention to provide such a demodulator and decoder for a processing satellite operating in a satellite based cellular communications system.

SUMMARY OF THE INVENTION

In accordance with the teachings of the present invention, an uplink demodulator system for use in a processing satellite in a satellite based communications system is provided. The uplink demodulator system is operable to operate among multiple operating modes having different channelizations and different coding strengths. The uplink demodulator system also receives channelized data that is time aligned with the corresponding uplinks based upon a synchronization system.

In one preferred embodiment, an uplink demodulator system for use in a processing satellite in a satellite based communications system includes a first multiplexer, a multichannel preamble processor, a multichannel phase tracker, first and second output paths and a second multiplexer. The first multiplexer is operable to receive channelized data from a plurality of channelization modes and operable to route this channelized data to the multiplexers output. The multichannel preamble processor is in communication with the first multiplexer and operable to determine a phase estimate for each channel of said channelized data. The multichannel phase tracker is in communication with the first multiplexer and operable to receive the phase estimates from the multichannel preamble processor and further operable to track a phase for each channel of the channelized data to phase align each channel of the channelized data to corresponding uplink signals. The first output path is in communication with the multichannel phase tracker and operable to operate on heavy encoded channelized data. The second output path is in communication with the multichannel phase tracker and operable to operate on light encoded channelized data. The second multiplexer is operable to multiplex and route the heavy encoded channelized data from the first output path and the light encoded channelized data from the second output path to a second output where this multiplexed data is phase aligned with the corresponding uplink signals.

Use of the present invention provides an uplink demodulator system for use in a processing satellite in a satellite based cellular communications system. As a result, the aforementioned requirements associated with demodulating and decoding channelized data in a processing satellite have been met.

BRIEF DESCRIPTION OF THE DRAWINGS

Still other advantages of the present invention will become apparent to those skilled in the art after reading the following specification and by reference to the drawings in which.

DETAILED DESCRIPTION OF THE PREFERRED EMBODIMENTS

The following description of the preferred embodiment concerning an uplink demodulator scheme for a processing satellite used in a satellite based cellular communications system is merely exemplary in nature and is not intended to limit the invention or its application or uses.

Figure 1:
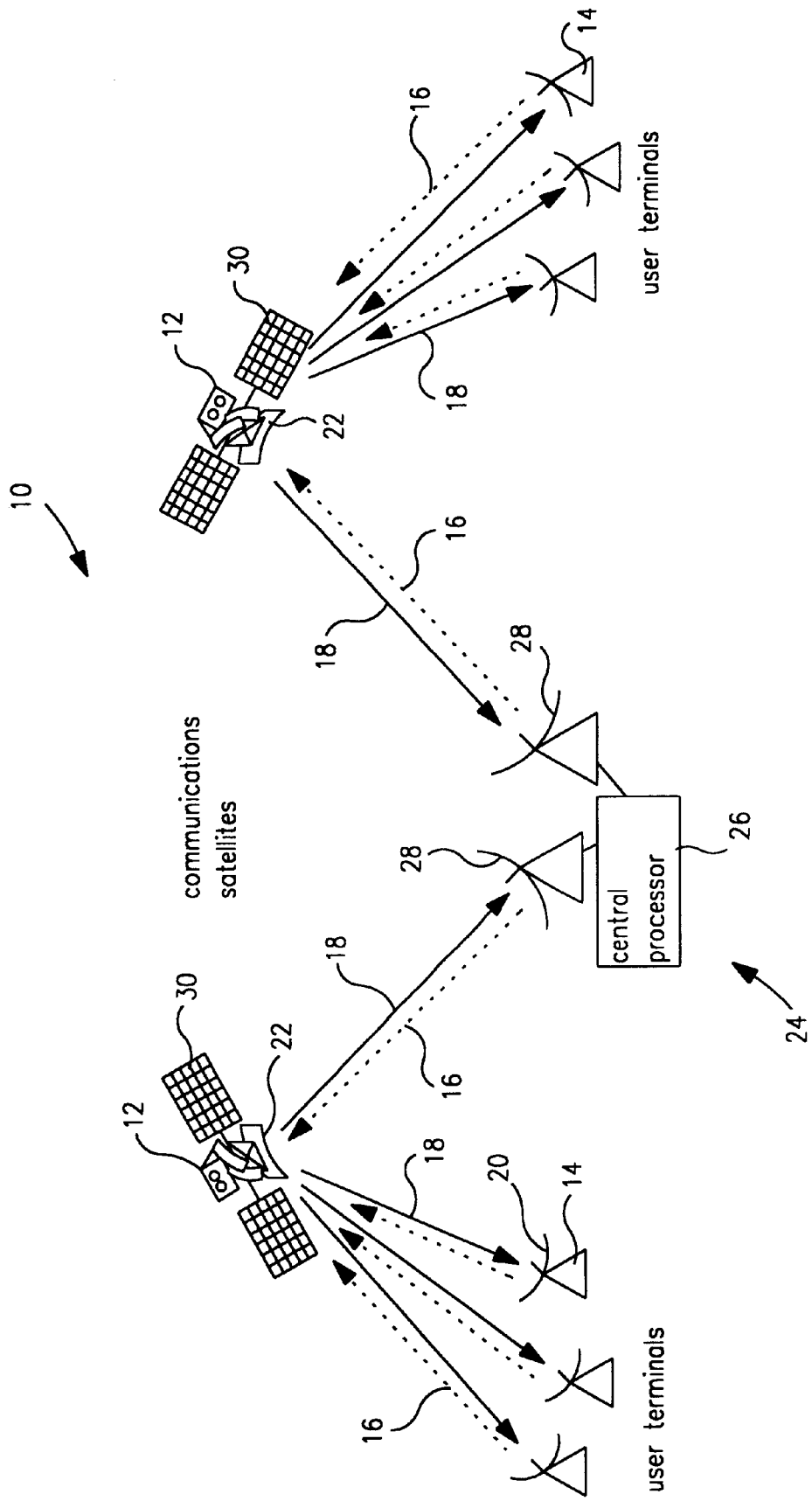
FIG. 1 is an overall satellite based cellular communications system block diagram.

Referring to FIG. 1, a satellite based cellular communications system for supporting multiple users located in multiple geographic areas or ground cells is shown. The communications system 10 includes one or more processing satellites 12 operating generally in geosynchronous orbits. Each processing satellite 12 supports multiple terrestrial user terminals 14 positioned within various defined ground cells, further discussed herein. Each processing satellite 12 receives data signals from the user terminals 14 on the communications uplinks 16 and transmits data signals to the user terminals 14 on the communications downlinks 18. Each user terminal 14 transmits data signals on the communications uplinks 16, which may include multiple carrier channels and formats, and receives data signals on the communications downlinks 18, via an antenna 20. Each processing satellite 12 receives and transmits the data signals on the communications uplinks 16 and the communications downlinks 18, via a multibeam antenna 22 or any other appropriate antenna to service the required region.

The satellite based cellular communications system 10 also includes a network control center (NCC) 24 which includes a central control processor 26. The network control center 24 generally controls the overall operations of each processing satellite 12 utilizing communications uplinks 16 and communications downlinks 18, via an antenna 28. These overall operations include maintenance of the geosynchronous orbit, positioning of solar collectors 30, initializing satellite system parameters, user billing, as well as other operational controls which are all well known in the art. The central control processor 26 in the network operations center 24 is preferably a general purpose programmable computer of appropriate computational power.

Figure 2:
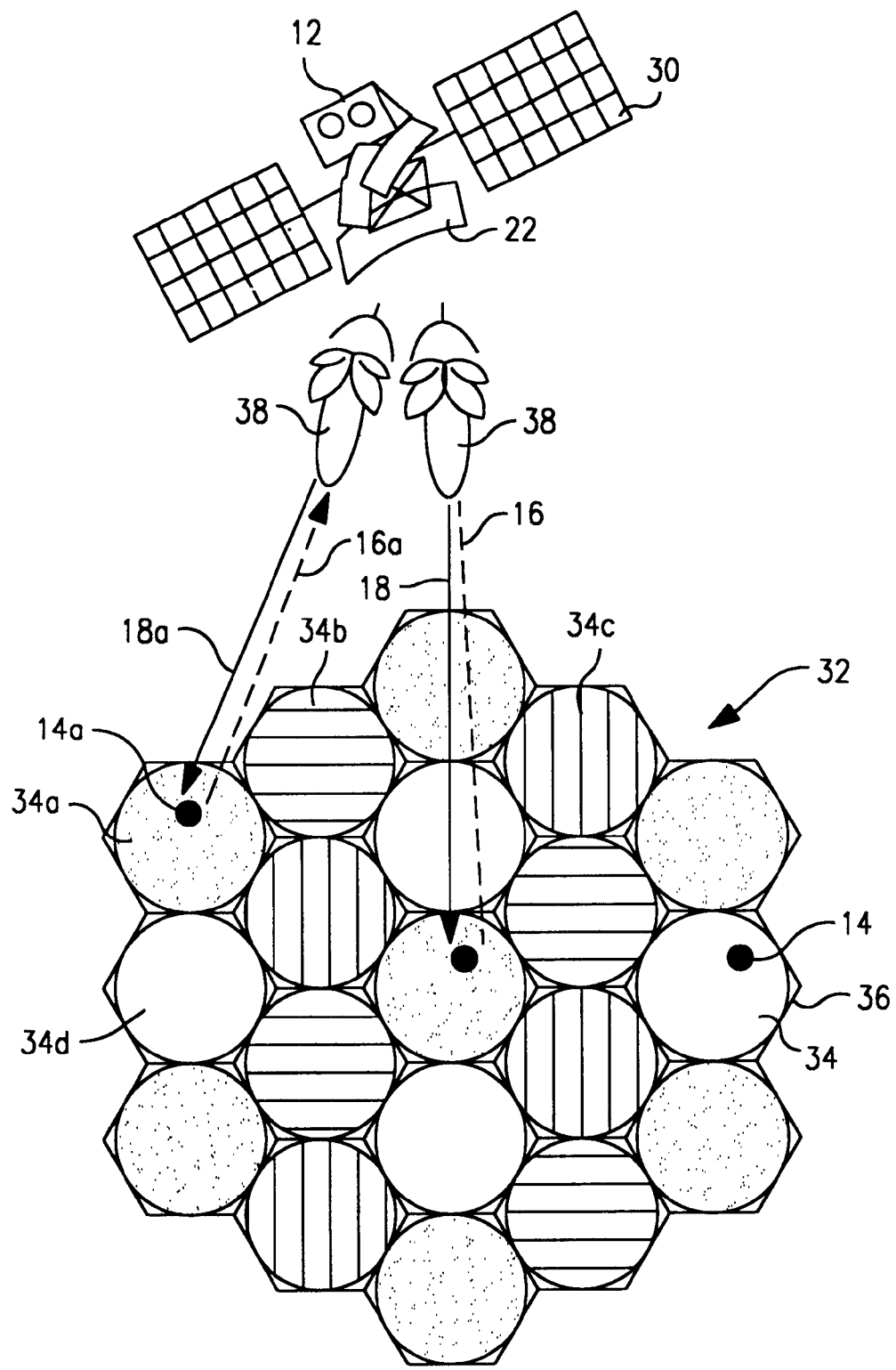
FIG. 2 is a detailed block diagram of communications uplinks and downlinks between terrestrial user terminals located within multiple ground cells and a processing communications satellite.

Referring now to FIG. 2, a processing communications satellite 12 is shown illuminating a coverage region 32, via antenna 22. The processing satellite 12 services the coverage region 32 which includes multiple ground cells 34 represented by each circular region. Each of the ground cells 34 is shown as a hexagonal shaped region 36. These regions are each individually illuminated by one antenna beam from the multibeam antenna 22 on the communications satellite 12. Each ground cell 34 typically measures approximately 300 to 400 miles in diameter and is generally measured as the shortest distance between two points where the antenna gain in minimally acceptable. For example, this may be a point at which the antenna gain drops off by 5 or 6 dB.

The coverage region 32 is shown utilizing what is known as a 4-to-1 reuse where the coverage region 32 is separated into one of four types of ground cells 34a–34d. Of course, any other type of reuse pattern may also be employed. Each of the ground cells 34 having the same shading operate within the same frequency band. Each frequency band, which is preferably about 125 MHz wide, is separated into preferably seven sub-bands (carrier frequency channels), each having a bandwidth of about 17.85 MHz. The subbands are available to users or terrestrial terminals 14 operating within the ground cells 34. For example, each of the ground cells 34a may be allocated a first 125 MHz frequency band that is divided into seven 17.8 MHz subbands where each sub-band may be divided into multiple channels of 1,5 or 25 (X, Y, and Z). In this way, user terminal 14a within ground cell 34a may be allocated at least one of the channels within at least one of the sub-bands and at least one of the time slots allocated to that particular channel. Similarly, each of the ground cells 34b may be allocated a second 125 MHz frequency band, each of the ground cells 34c may be allocated a third 125 MHz frequency band and each of the ground cells 34d may be allocated a fourth 125 MHz frequency band. In other words, all of the ground cells identified as 34a will be operated within the same 125 MHz frequency band having the same channels available and so forth throughout each set of ground cells 34 within the coverage region 32.

User terminal 14a in ground cell 34a may be operating within one of the seven (7) sub-bands of the first 125 MHz frequency band and say, for example, channel one of a Y mode allocation. The communications uplink 16a originating from user terminal 14a is directed into a main beam 38 of the multibeam antenna 22 servicing ground cell 34a. User terminal 14a may also be bursting on and off within a particular time slot for carrier channel one within the sub-band. User terminal 14a may also use additional carrier channels within the sub-band and/or additional time slots depending on how much bandwidth the user terminal 14a requires to transmit all its data, via the communications uplink 16a.

Each of the communications downlinks 18 from the communications satellite 12 to the multiple user terminal 14 within each group of ground cells 34a-34d operate on a single carrier frequency or channel and is generally always on. In other words, all of the ground cells 34a operate on a first carrier frequency, all of the ground cells 34b operate on a second carrier frequency and so forth. The reason for the single carrier frequency being used for each group of ground cells 34a-34d on the communications downlinks 18 is because of the limited power constraints associated with operating the processing communications satellite 12.

Figure 3:
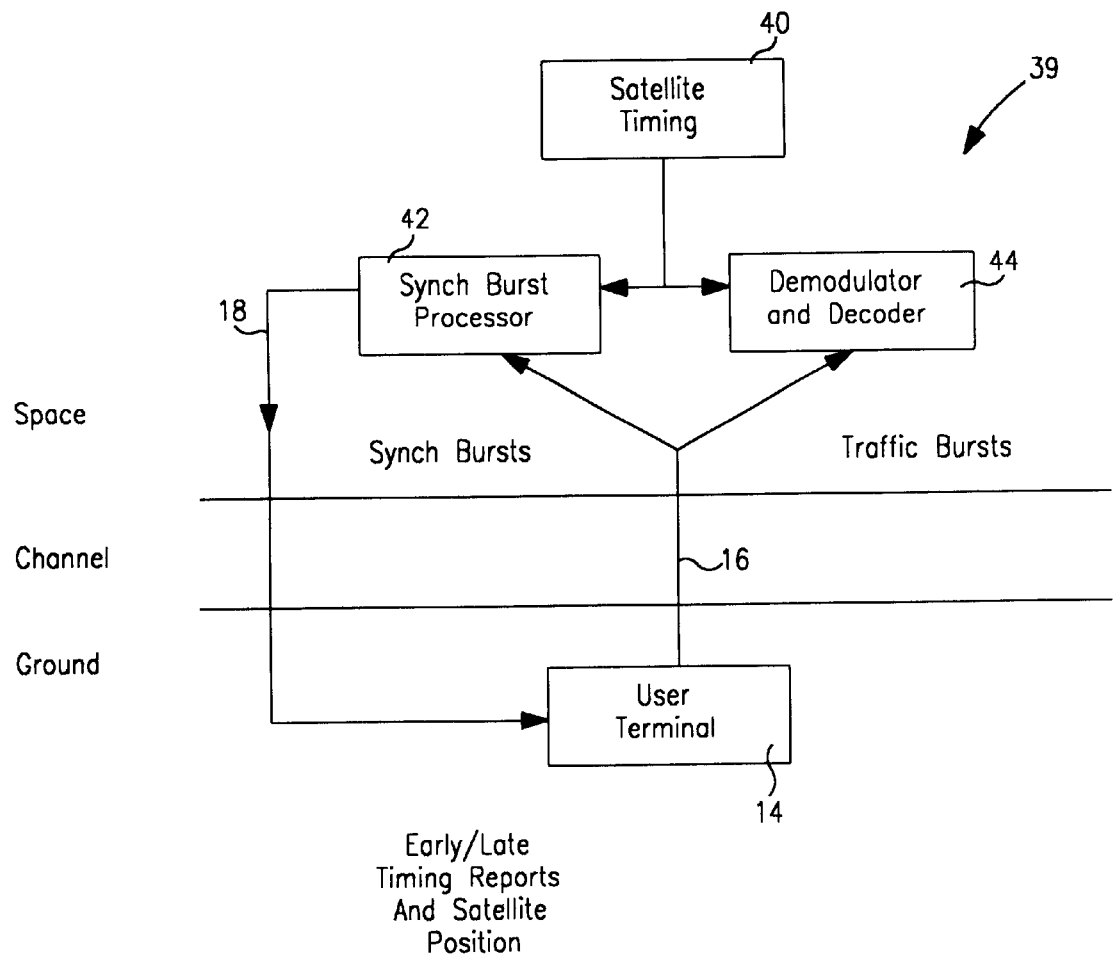
FIG. 3 is a block diagram illustrating the synchronization scheme of the demodulator and decoder according to the teachings of the present invention.

Turning to FIG. 3, a satellite synchronization system 39 used in combination with a demodulator and decoder of the present invention is shown. In this regard, the satellite synchronization system 39 includes satellite timing 40, a sync burst processor 42, a demodulator and decoder 44 and a user terminal 14. This synchronization system 39 enables the demodulator and decoder 44 to operate without having explicit symbol timing recovery and/or burst framing unlike conventional demodulators. The operation for the synchronization system 39 is as follows. The user terminal 14 periodically forwards sync bursts used for the synchronization scheme 39, along with traffic bursts in its uplink 16. The time of arrival of the sync bursts are determined by the sync burst processor 42 located within the processing satellite 12 and disclosed in further detail in U.S. Ser. No. 09/48,261 filed herewith having a title "Synchronization Burst Processor for a Processing Satellite", which is hereby incorporated by reference. The sync burst processor 42 prepares report cells which are forwarded to the user terminal 14, via the downlink 18 which identify the early/late status of the sync bursts. Upon receipt, the user terminal 14 adjusts and corrects its uplink timing, in accordance with the report cell, thereby maintaining all of its uplink activity in close time alignment with the satellite timing 40. The common timing source of the satellite timing 40 is used for both the sync burst processor 42 and the satellite demodulator and decoder 44. In other words, the timing obtained through the sync burst processor 42 applies to the demodulator and decoder 44 also. Therefore, instead of the demodulator and decoder 44 adjusting its clock, the sync burst processor 42 forwards the early/late report cells to the user terminal 14, via the downlink 18 and the terminal 14 adjusts its transmit clock to provide long loop timing control, as compared to local loop timing control, via the demodulator and decoder 44.

Figure 4:
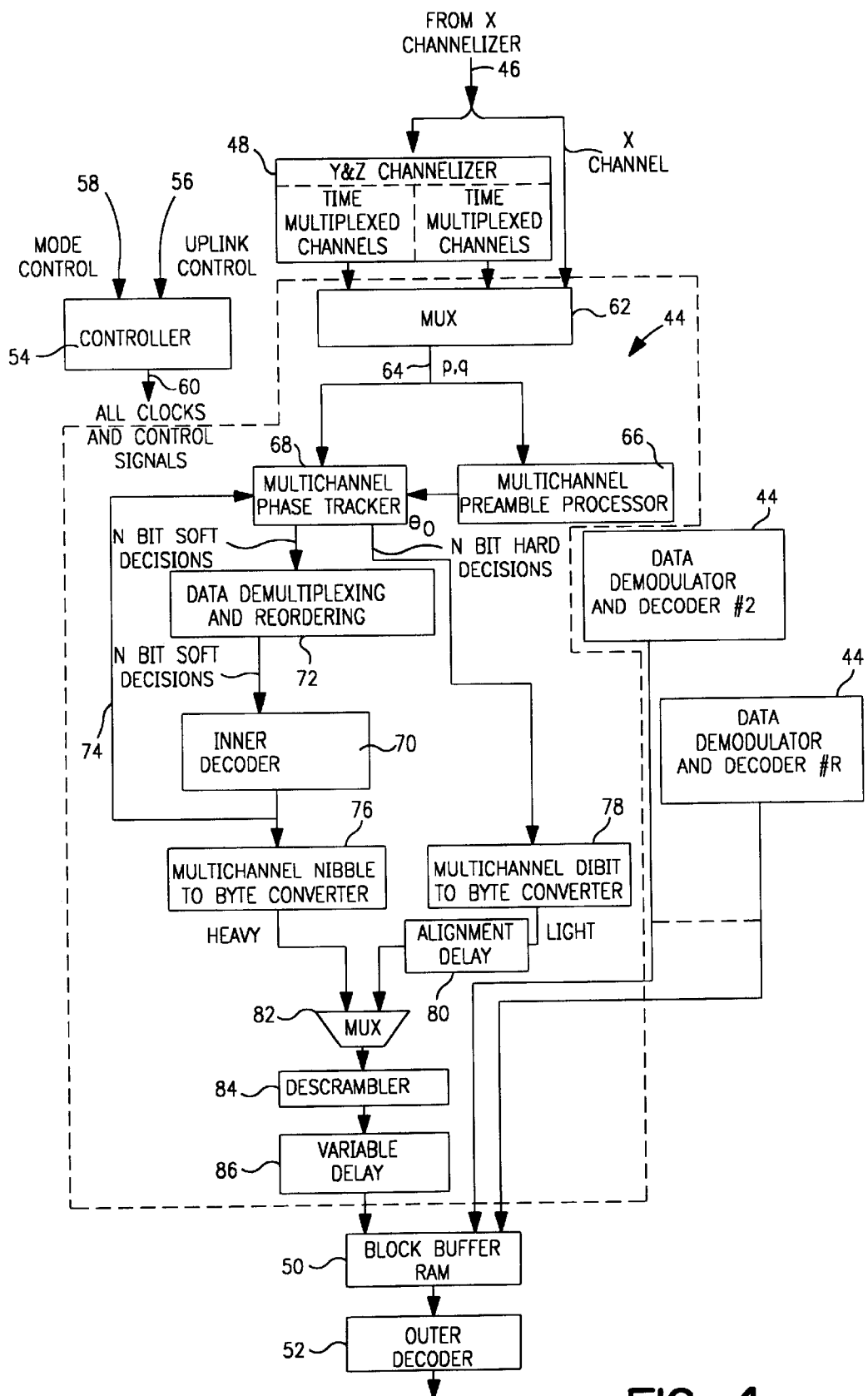
FIG. 4 is a detailed block diagram of the demodulator and decoder according to the teachings of the present invention.

Referring to FIG. 4, the demodulator and decoder 44 is shown in further detail in association with other components of the processing satellite 12. The data demodulator and decoder 44 will be described in two parts. In the first and simpler part, the operation will be restricted to mode X operation. The adaptations needed to allow the data demodulator and decoder 44 to operate in modes Y and Z will be described in the second part. The data demodulator and decoder 44 interfaces with a pair of upstream channelizers 46 and 48 and with a downstream block buffer RAM 50 and an outer decoder 52. The data demodulator and decoder 44 operates under the direction of an onboard controller or microprocessor 54 which receives timing signals from the satellites synchronization scheme 39, via uplink control 56, as well as what particular mode the sub-band is operating in, via mode control 58. The controller 54 provides all the clock and control signals to the data demodulator and decoder 44, via output 60. The controller 54 is preferably a pipeline processor or any other appropriate programmable microprocessor to meet the computational tasks.

The X channelizer 46 isolates the signals present in each of the seven (7) sub-bands operating within one cell 34 having a total bandwidth of about 125 MHz. The X channelizer 46 separates the signals received within the cell 34 into the seven (7) separate sub-bands and presents one of the sub-bands or channelized data in a digital form of sample pairs to the data demodulator and decoder 44. This digital data is multiplexed in sets of 5 or 25 sample pairs for Y and Z channel operation, respectively. The sample pairs within each set are concurrent in time. The digital samples from the X channelizer 46 have also been matched filtered with an X channel shaping function. The samples produced by the X channelizer 46 to either the center (or convergence) point of the eye diagram (even set) or the midpoints between convergence (odd set).

When operating in mode X, a single user terminal 14 operates on a single channel within the entire sub-band within the cell 34 having a data rate of about 14 megasymbols per second and having a bandwidth of about 17.8 MHz. All requisite filtering in the mode X is performed in the X channelizer 46. The processing satellite's synchronization system 39, is locked to the same timing system as the demodulator but otherwise functions independently of the data demodulator and decoder 44. As a result of the synchronization system 39, the symbol or bit timing is closely controlled so that the samples produced by the X channelizer 46 correspond very closely to either the peak of the internal matched filter eye diagram (even set) or to a midpoint between the peaks of the eye diagram (odd set). Because the data demodulator and decoder 44 is not required to derive timing symbol corrections, the odd set from the X channelizer 46 is irrelevant to the data demodulator and decoder 44, such that the data demodulator and decoder 44 begins its processing by discarding half of the sample pairs, retaining the even set under the direction of the controller 54. Another simplifying factor in mode X is that the samples or channelized data are sequentially related so that no demultiplexing or parallel processing is required to process mode X bursts.

The data samples or channelized data from the X channelizer 46 when operating in the X mode are applied directly to a 3 to 1 multiplexer 62. The multiplexer 62 essentially routes or directs one of three inputs which receives channelized data under a plurality of modes (X, Y and Z) to its single output at the sample rate of 14 megasymbols per second. The output sample rate is the same for any mode of operation. The sample data stream is then applied to a (p, q) bus 64. This channelized data is already time synchronized to its corresponding uplink, via the synchronization system 39, but has an unknown phase rotation. Under the direction of the controller 54, a set of samples corresponding to a complete X mode burst slot are passed from the X channelizer 46 through the multiplexer 62 and onto the (p, q) bus 64, while the samples from the burst that correspond to its guard time are discarded. The number of samples coupled in a burst depends directly on whether the burst being processed has heavy or light coding. As previously indicated, in the X mode, all the symbols or samples are either heavy or light coded and not a mix of heavy or light coding. Typically, this number is 1920 or 960 samples, respectively, and is referred to as $N_h$ or $N_l$. It should further be noted that the processing steps performed herein proceed in real time as the burst samples are presented on the (p, q) bus 64. These various steps are all pipelined and coordinated by the controller 54.

The first several samples from each burst consist of the burst header or preamble and are routed from the (p, q) bus 64 to a multichannel preamble processor 66. The multichannel preamble processor 66 correlates these preamble samples against a known header structure and supplies an estimate of a starting phase $\theta_o$ for each channel of the channelized data to a multichannel phase tracker 68 which is a digital decision-directed phase lock loop (DD-PLL). The number of samples in the burst header ($H_h$ and $H_l$) depend upon whether heavy or light coding is being used and is, typically, 32 or 16 symbols or bits, respectively. The known structured bipolar template sequence [t(h)] is used for the header or preamble: that is t(n)=±1. The header or preamble for heavy bursts uses this sequence twice. It should be noted that the sequence [t(h)] is supplied to the multichannel preamble processor 66 by the controller 54 and, therefore, may be reconfigured as required, via the uplinks 16 and downlinks 18 in the satellite system 10.

The multichannel preamble processor 66 correlates the p and the q samples against [t(n)] to produce variables P and Q as follows:

$$P=SUM[n=1 \text{ to } H_l: p(n)*t(n)] \quad Q=SUM[n=1 \text{ to } H_l: q(n)*t(n)]$$

for light coding and repeats this operation and sums the results for a heavy coding burst. The multichannel preamble processor 66 then estimates the initial phase for the burst by taking the arctangent of Q/P.

$$\theta_o=ATN[Q/P]$$

This correlation processing is typically performed in a standard accumulator that is configured to add or subtract as required by the sign of t(n) and the phase estimate $\theta_o$ is typically produced using a ROM. The phase estimate $\theta_o$ of the starting phase or phase rotation is then supplied to the multichannel phase tracker or digital decision-directed phase lock loop 68. This phase estimate $\theta_o$ represents the phase of the corresponding uplink signal 16 of the terminal 14 and is used to align the data samples before the samples are demodulated and decoded.

The remaining burst samples or bits $B_h$ or $B_l$ relate to the body of the burst ($B_{l=Nl}-H_l=960-16=944$ and $B_h=1888$ in the typical case). Again, under the direction of the controller 54, the even samples of the burst body are directed to the multichannel phase tracker 68, via the (p, q) bus 64 which is used to track the phase of the uplink signal 16 so as to restabilize and align the phase of the sample pairs in the phase space of the user terminal 14. In other words, the multichannel phase tracker 68 phase aligns the channelized data for each channel with the corresponding phase in the corresponding uplink signal 16. Thus, the primary operation of the multichannel phase tracker 68 is to provide an estimate, $\theta$, of the signal's phase and is conventional in the X mode. In this regard, a sample pair (p, q) is converted from rectangular to polar coordinate form to yield (r, $\Phi$). The phase difference $\psi=\Phi-\theta$ is formed in a subtractor and used to restore the samples to rectangular form as (x, y), according to x=r*COS [$\psi$] and y=r*SIN [$\psi$]. Both transformations from polar to rectangular coordinates are typically made by means of a lookup table implemented in a ROM.

The multichannel phase tracker 68 operates in one of two modes relative to decision direction and depending on whether the data demodulator and decoder 44 is in mode XL or XH. For light coded bursts, the multichannel phase tracker 68 treats the even sample pairs as independent and forms an error estimate for the multichannel phase tracker loop filter using the limitation of $\psi$ to form a phase error $\epsilon$ of + or −45 arcdeg. This constitutes a conventional digital-direction phase lock loop. This light mode multichannel phase tracker 68 operates as a first order phase lock loop that simply integrates k*$\epsilon$ to yield $\theta$. Since the synchronization scheme used in the processing satellite 12 maintains the uplink frequency 16 within a very tight tolerance (typically no worse than ±500 Hz or, equivalently, 0.001 revolution per symbol epoch for the slowest transmission rate (typically 500 kilosymbols per second for X mode), a simple first order loop with a loop gain k in the range of 1/32 is adequate to track the phase. The multichannel phase tracker 68 may, optionally, use a lower loop gain when processing bursts from modes Y or X. The output from the multichannel phase tracker 68 in a light coded burst are demodulated hard decisions of the data that are time synchronized under the synchronization system 39. These hard decisions are generally QPSK format having two bits per symbol and outputed as dibits.

For heavy coded bursts, four consecutive symbols are related in that they represent a codeword in an (8, 4) biorthogonal code. In this regard, the decision direction is based on the decoded results from an inner decoder 70. This produces a more accurate phase estimate $\epsilon$ for the loop. Again, a simple first order loop is sufficient to provide satisfactory operation for a typical processing satellite 12. Since this advanced loop operates at one quarter the symbol epoch rate, the loop gain constant is set higher than for the light coded case, with 0.25 being a typical loop gain. With the heavy mode, the stabilized (x, y) even samples are forwarded to an inner decoder 70 for decoding the inner code present on the heavy coded burst, typically the (8, 4) biorthogonal code as previously noted. Since four QPSK symbols are required to convey the eight components of this code, the processing cadence is divided by four at this processing point when in the heavy mode. Four soft decision sample pairs [x, y] emerging from the multichannel phase tracker 68 are then buffered in a data demultiplexing and reordering buffer 72. These soft decisions essentially include a digital representation of a hard decision one or zero, along with additional coding indicating whether the one or zero is a strong or weak decision. Both the multichannel preamble processor 66 and the multichannel phase tracker 68 are further disclosed in detail in U.S. Pat. Ser. No. 6,236,687 filed Feb. 26, 1999, and entitled "Improved Decision Directed Phase Locked Loop (DD-PLL) For Use With Short Block Codes In Digital Communication Systems" which is hereby incorporated by reference.

The data demultiplexing and reordering buffer 72 receives the sample pairs and regroups them a block at a time. In other words, in the X mode, these sample pairs are grouped in blocks of eight samples or bits which the inner decoder 70 requires to process. In the case of the Y and Z modes, the data demultiplexing and reordering buffer 72 takes the time multiplexed data and demultiplexes the channels to produce separate blocks of 8 bits for each channel, further discussed herein. A detailed discussion of the data demultiplexing and reordering buffer 72 is set forth in U.S. Ser. No. 09/239,871 filed Jan. 29, 1999 and entitled "Buffering And Sequencing Of Soft-Decisions From Multiple Channels Into Single Shared Biorthogonal Decoder", which is hereby incorporated by reference.

The inner decoder 70 is a soft decision block decoder for the well known (8, 4) biorthogonal code and operates to provide maximum likelihood decisions at the nibble level (i.e., four bits or samples). In this regard, the inner decoder 70 decodes the inner decoded data that is present in the heavy encoded channelized data. The algorithm used by the inner decoder 70 is the Fast Hadamard Transform and is well known in the art. The inner decoded data samples from the inner decoder 70 is returned back to the multichannel phase tracker 68, via feedback 74, as well as passed to a multichannel nibble to byte converter 76. The results from the feedback path 74 returns the results of the decoding process to modify the decision direction in the multichannel phase tracker 68. Alternatively, the phase tracker may use conventional per symbol decision direction in heavy as well as light modes.

The multichannel nibble to byte converter 76 takes two nibbles which consists of four bits each from the inner decoder 70 to form one byte of eight bits. When in the Y or Z mode, the multichannel nibble to byte converter 76 assembles bytes for the number of channels (5 or 25) being processed at a time, further discussed herein. The hard decision data bits or samples from the multichannel phase tracker 68 are applied to a multichannel dibit to byte converter 78. The multichannel dibit to byte converter 78 receives two bits at a time (i.e., dibit) in QPSK and takes four of the two bit decisions to assemble a single 8 bit byte. The multichannel dibit to byte converter 78 also operates in a multichannel fashion when in the Y or Z mode, further discussed herein. In other words, two nibbles are combined to form a byte and four dibits of two bits are assembled to form a byte or octet. The multichannel nibble to byte converter 76 and the multichannel dibit to byte converter 78 are discussed in further detail in U.S. Ser. No. 09/239,872 filed Jan. 29, 1999 and entitled "Serial To Parallel Conversion Of Data To Facilitate Sharing A Single Buffer Among Multiple Channels" which is hereby incorporated by reference.

Because of the delay in processing through the data demultiplexing and reordering buffer 72 and the inner decoder 70, an alignment delay 80 is used to time align the bytes from the multichannel nibble to byte converter 76 and the multichannel dibit to byte converter 78 before the data bytes are delivered to a 2 to 1 multiplexer 82. The multiplexer 82 receives the bytes time aligned due to the alignment delay 80 and phase aligned and multiplexes the two inputs of heavy and light encoded data to a single output. This single output of multiplexed bytes is forwarded to a descrambler 84. The descrambler 84 descrambles the bits using the same algorithm used by a scrambler in the user terminal 14 to provide unscrambled usable data. The descrambled data from the descrambler 84 is then forwarded to a variable delay module 86. Since there are preferably seven sub-bands in a cell 34, there are 1 to R demodulators and decoders 44, where R is preferably 7. Because of this, the variable delay module 86 is used in each data demodulator and decoder 44 to ensure time alignment of the data bytes delivered to the block buffer RAM 50, which receives data from each data demodulator and decoder 44 for the particular sub-beam that covers the particular cell 34.

Since the outer decoder 52, which is a Reed-Solomon decoder 52, is fast enough to handle several sub-bands (typically 7 sub-bands in a beam), the outer decoder 52 is shared among the several data demodulator and decoders 44, via the block buffer RAM 50. The Reed-Solomon decoder 52 operates on a single block of a single channel at a time, therefore, each observable block must be assembled in toto prior to any part of it being transferred to the outer decoder 52. Accordingly, the bytes of the demodulated and possibly inner decoded data are buffered in the block buffer RAM 50, further discussed herein. The block buffer RAM 50 is disclosed in further detail in U.S. Ser. No. 09/240,171 filed on Jan. 9, 1999 and entitled "Buffering And Sequencing Of Data From Multiple Channels Through A Shared Decoder" which is hereby incorporated by reference. Upon completion of a demodulation of a burst, the assembled block in the block buffer RAM 50 is forwarded to the Reed-Solomon decoder 52 for final outer decoding of the demodulated data. In this regard, it should be noted that the single outer decoder 52 is used to support multiple data demodulators and decoders 44, thereby decreasing the overall hardware cost, complexity and power consumption on board the satellite 12.

When the data demodulator and decoder 44 operates in either mode Y or Z (i.e., 5 or 25 channels), the samples forward from the X channelizer 46 requires additional pre-processing prior to being presented to the demodulator and decoder 44, as discussed above. A discussion of the mode Y operation will follow with the understanding that the operation for mode Z is similar except that the number of channels being processed is 25 in mode Z versus 5 in mode Y.

The purpose of the Y and Z channelizer 48 is to complete the channelization process by resolving the particular sub-band into its constituted parts (typically 5 channels for a mode Y) and to provide the mode Y matched filtering. These filtering operations are performed concurrently in a digital filter structure, with one digital filter for the p components and another for the q components. The Y and Z channelizer 48 produces 5 even sample pairs during the mode Y symbol epoch. These even sample pairs are coupled into the digital filters within the Y and Z channelizer 48 under the direction of the controller 54 which insures that proper sequencing of the channels is maintained. Each digital filter in the Y and Z channelizer 48 produces 5 Y mode symbol outputs at every fifth epoch of the upstream X channelizer 46. The lines of the channelizer 48 provides even (peak of the eye diagram for a filtered Y symbol) and odd Y type samples. As discussed above, for the mode X description, the odd sets are irrelevant and discarded. In other words, the Y and Z channelizer 48 will receive one sample for each Y or Z channel and then return to the first Y or Z channel to match up the next set of samples in a time multiplexed fashion. The multiplexer 62 receives the 5 time multiplexed channel data from the Y and Z channelizer 48 and routes it to the (p, q) bus 64, such that the sample rate out of the multiplexer 62 is the same for all three modes.

When operating in the Y channel mode, the demodulator and decoder 44 receives concurrently five samples relating to the five separate Y burst slots. To facilitate the concurrent processing of these samples, the data demodulator and decoder 44 utilizes a shared processing approach, further discussed herein. As with the mode X case, the samples from the burst preamble are first routed to the multichannel preamble processor 66. Since five correlations must be performed in parallel, the correlator in the multichannel preamble processor 66 is provided with a memory in which to preserve the partial results of each of the five works in progress. Otherwise, the process of estimating the initial phase is the same as for the mode X, as described above. In other words, the multichannel preamble processor 66 operates on all five channels simultaneously to determine each phase since the data arrives sequentially in time and the multichannel preamble processor 66 internally stores this data as it is received as state variables. These intermediate state variable results are stored independently for each Y channel so that the data is time multiplexed.

The phase estimates provided from the multichannel preamble processor 66 are used to initiate the phase tracker which derotates the data before it is subsequently demodulated and decoded. It should further be noted that the processing rate for the Y or Z mode, as well as the X mode is performed on the same total operation rate per second. In this regard, in X mode, one channel is processed at 14 megasamples per second, in Y mode, five channels are processed each at 2.8 megasamples per second and in the Z mode, twenty five channels are processed each at 0.56 megasamples per second. One complication that exists in the mode Y and Z situation is that the channels may not all be coded in the same mode. In other words, some of the channels may be heavily encoded and other channels may be lightly encoded. In this case, different length correlations are performed on the two types of coding, the onset of the body of the burst occur at different epochs, and a second light code burst falls in the second half of a heavy code burst. The controller 54 provides the necessary control to insure that the multichannel preamble processor 66 processes both the heavy and the light code bursts properly.

Following the initial phase estimation from the multichannel preamble processor 66, five phase estimates are forwarded to the multichannel phase tracker 68. The multichannel phase tracker 68 operates similar to that in the X channel mode, except that the multichannel phase tracker 68 now processes all five of the Y channels, simultaneously. The approach taken here is similar to that described above for the multichannel preamble processor 66. Specifically, each of the five Y mode channels is provided with a memory cell to retain the loop state variable "θ" with one value of θ associated with each of the five bursts that are being concurrently phase tracked. The multichannel phase tracker 68 may be operated in either the heavy or the light code manner in Y mode, since at each symbol epoch the loop usage is independent from channel to channel.

Following t he multichannel phase tracker 68, the controller 54 directs the (x, y) loop output from a heavy mode channel to the inner decoder 70 after demultiplexing and reordering the data in the data demultiplexing and reordering buffer 72. In Y mode, the decoder 70 operates similar to the way it does with the X mode. The only exception is where four symbol aggregation is performed. In this case, the retaining memory for the soft decisions (x, y) is larger and is entered in a multiplexed manner, again under the direction of the controller 54. In other words, assuming the inner decoder 70 requires eight soft decisions in order to decode and there are five Y channel outputs, 40 samples or bits into the data demultiplexing and reordering buffer 72 are regrouped by taking the time multiplexed data and grouping them a block at a time per channel. For example, the data demultiplexing and reordering buffer 72 would require 40 input bits or samples to get or provide five channel blocks of eight which are forwarded separately to the inner decoder 70. The inner decoder 70 works on each channel individually by decoding each of the five blocks of eight bits separately.

The demodulated and decoded data is then returned to the multichannel phase tracker 68, via the feedback 74 for further decision adjustment and also forwarded to the multichannel nibble to by the converter 76. Here again, the multichannel nibble to byte converter 76 includes individual memory for each of the channels to organize and store each of the data from the separate channels and bytes. For channels operating in the YL mode, the controller 54 routes the dibits produced by the hard decision outputs of the multichannel phase tracker 68 to the multichannel dibit to byte converter 78 which also has individual memory for each of the channels operating in mode YL. This data passes through the alignment delay 80 to insure that the bytes received at the multiplexer 82 are time aligned. This data is again descrambled in the descrambler 84 and time adjusted, via the variable delay 86, to align the receipt of the data between the different data demodulator and decoders 44 relative to the block buffer RAM 50. The block buffer RAM 50 assembles the bytes into individual pre-release buffers, ten in total, in the Y mode, which are staged at the output of the block buffer RAM 50 until complete observable blocks are available. Some number between 5 and 10, inclusive, of these buffers are filled during the course of a YH slot interval, with two buffers being used by each light channel and one by each heavy channel. For a Z channel between 25 and 50 buffers may be filled. Note that when operating in the mixed mode where some of the channels are mode YH and some are YL, the block completion cycle for those channels operating in the YL is only half that for those operating in the YH. Thus, the block buffer RAM 50 signifies block completion to the outer decoder 52 twice during the mode Y processing cycle for those channels in mode YL.

When operating in the Z channel mode, the data demodulator and decoder 44 operates as described for the Y channel mode, except that the Y and Z channelizer sub-band samples are separated into 25 (rather than 5) parallel streams by a mode Z digital filter and matched filtered to the Z channel wave shape. Also, the various points at which shared processing occurs in mode Y are provided with memory for 25 items rather than 5. It should further be noted that while mode Y is disclosed as having five channels and mode Z is disclosed as having twenty-five channels, those skilled in the art will recognize that any number of appropriate channels may be processed by the data demodulator and decoder 44 of the present invention.

Figure 5:
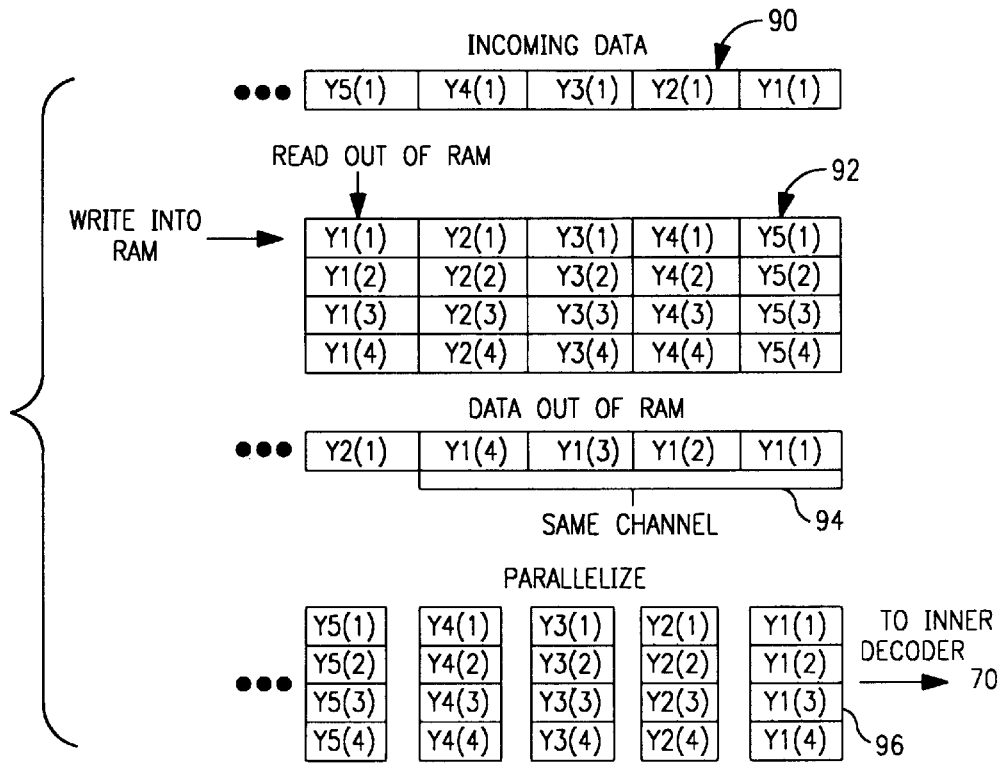
FIG. 5 is a block diagram of memory allocations for a data demultiplexing and reordering module of the demodulator and decoder.

Referring to FIG. 5, the memory allocation of the data demultiplexing and reordering buffer 72 is shown in further detail. In this regard, the example shown is for the Y channel mode with a single first bit or sample from each channel Y1–Y5 being written to RAM across a row 90 is shown as incoming data. The incoming data per channel are stored in columns identified by reference numeral 92 and read out synchronously by channels as shown by reference numeral 94. The data is parallelized and ordered in four data bits per channel (41–45) which are forwarded to the inner decoder 70, shown by reference numeral 96. As was previously indicated, a further detailed description of the data demultiplexer and reordering buffer 72 is disclosed in U.S. Ser. No. 09/239,871, filed Jan. 29, 1999, and entitled "Buffering And Sequencing Of Soft-Decisions From Multiple Channels Into Single Shared Biorthogonal Decoder".

Figure 6:
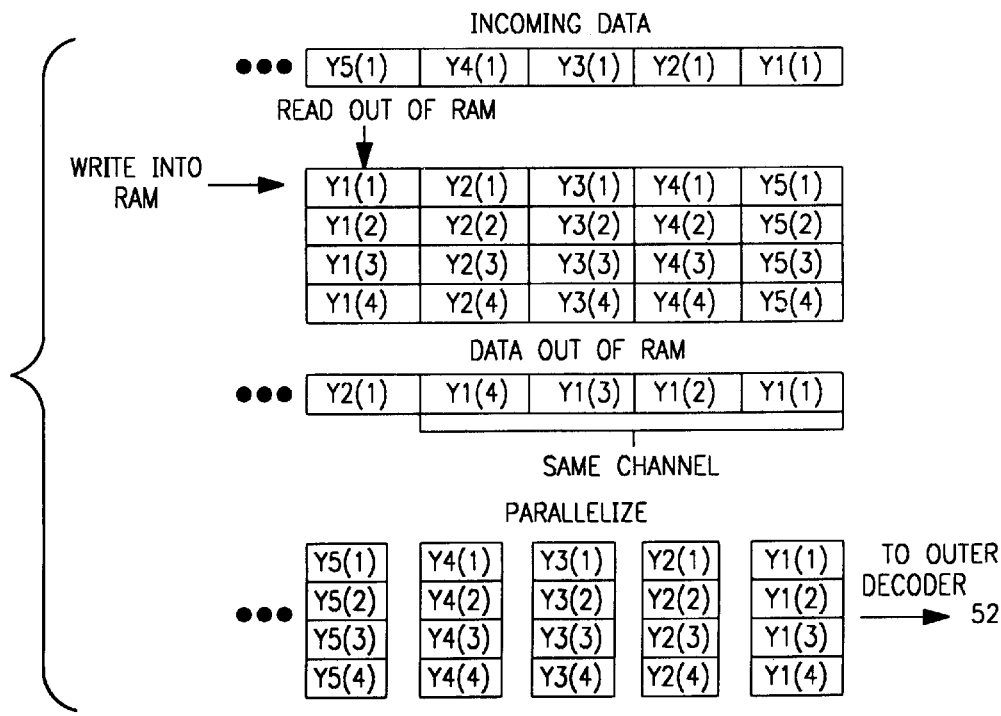
FIG. 6 is a block diagram of memory allocations for a multi channel dibit to byte converter module of the demodulator and decoder.

Referring to FIG. 6, the memory allocation of the multichannel dibit to byte converter 78 is shown in further detail. In this regard, here again, the data is read by way of rows with one bit per channel written to the multichannel dibit to byte converter 78 and organized or parallelized by channels similar to that as shown with the data demultiplexing and reordering buffer 72. As was also previously indicated, a further detailed description of the multichannel dibit to byte converter 78 is disclosed in U.S. Ser. No. 09/239,872, filed Jan. 29, 1999 and entitled "Serial To Parallel Conversion Of Data To Facilitate Sharing A Single Buffer Among Multiple Channels".

Figure 7:
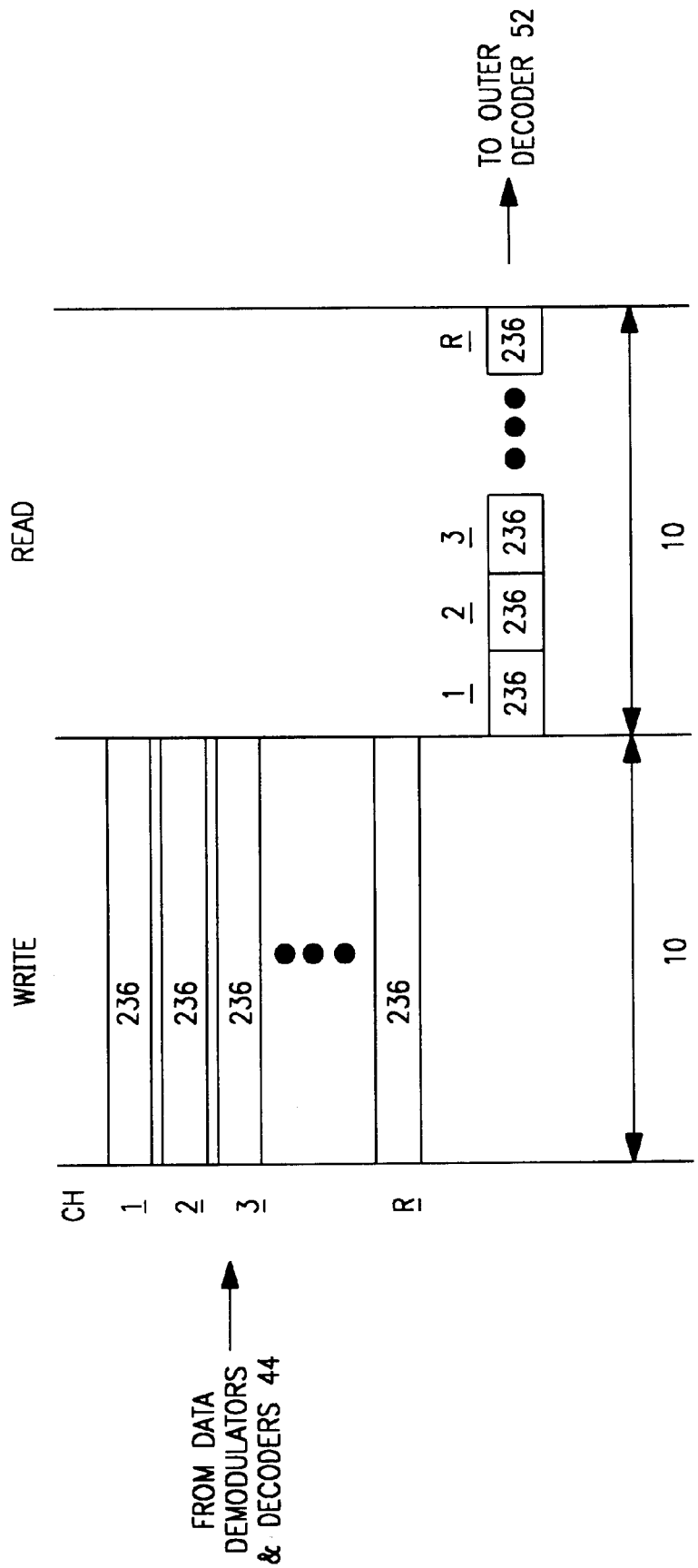
FIG. 7 is a block diagram of memory allocations for a block buffer RAM of the demodulator and decoder.

Referring finally to FIG. 7, the memory allocation of the block buffer RAM 50 is shown in further detail. As shown in FIG. 7, seven channels consisting of 236 times 25 blocks are written (WRITE) to the block buffer RAM 50 and read out sequentially as shown under the "Read" column. In other words, if in the X mode, 25 times 236 blocks per channel are written and read out from the block buffer RAM 50. If in the Z mode, 25 Z channels each having one or two blocks of 236 bytes are both written and read from the block buffer RAM 50. A further detailed description of the block buffer RAM 50 is set forth in U.S. Ser. No. 09/240,171, filed Jan. 29, 1999 and entitled "Buffering And Sequencing Of Data From Multiple Channels Through A Shared Decoder", which is hereby incorporated by reference.

The data demodulator and decoder 44 provides a demodulator and decoder 44 for a processing satellite 12 that performs the demodulation process independent of synchronization due to the satellite synchronization scheme 39. It is also switchable among multiple operating modes (X, Y, and Z) with different channelizations and switchable between operating modes with different coding strengths (heavy or light) and permits mixed coding modes in multichannel modes (Y and Z).

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. An uplink demodulator system for use in a processing satellite in a satellite based communications system, said uplink demodulator system comprising:
   a first multiplexer having a plurality of inputs and a first output, said first multiplexer operable to receive channelized data from a plurality of channelization modes at said plurality of inputs and operable to route said channelized data to said first output;
   a multichannel preamble processor in communication with said first output of said first multiplexer, said multichannel preamble processor operable to determine a phase estimate for each channel of said channelized data;
   a multichannel phase tracker in communication with said first output of said first multiplexer, said multichannel phase tracker operable to receive said phase estimates from said multichannel preamble processor and operable to track a phase for each channel of said channelized data to phase align each channel of said channelized data to corresponding uplink signals;
   a first output path in communication with said multichannel phase tracker, said first output path operable to operate on heavy encoded channelized data;
   a second output path in communication with multichannel phase tracker, said second output path operable to operate on light encoded channelized data; and
   a second multiplexer operable to multiplex and route said heavy encoded channelized data from said first output path and said light encoded channelized data from said second output path to a second output, wherein said multiplexed heavy encoded channelized data and said light encoded channelized data is phase aligned with said corresponding uplink signals.

2. The uplink demodulator system as defined in claim 1 wherein said plurality of channelization modes includes X mode having a single channel, Y mode having 5 channels and Z mode having 25 channels.

3. The uplink demodulator system as defined in claim 1 wherein said received channelized data from said plurality of channelization modes is time synchronized to its corresponding uplink.

4. The uplink demodulator system as defined in claim 1 wherein said first output path includes a data demultiplexing and reordering buffer operable to reorder said channelized data by channel and an inner decoder operable to decode inner encoded data present on said heavy encoded channelized data.

5. The uplink demodulator system as defined in claim 4 wherein said first output path further includes a multichannel nibble to byte converter operable to combine nibbles of said channelized data for each channel into bytes of channelized data for each channel.

6. The uplink demodulator system as defined in claim 1 wherein said second output path includes a multichannel dibit to byte converter operable to receive dibits of said channelized data for each channel and form bytes of said channelized data for each channel.

7. The uplink demodulator system as defined in claim 6 wherein said second output path further includes an alignment delay operable to align said light encoded channelized data on said second output path with said heavy encoded channelized data on said first output path.

8. The uplink demodulator system as defined in claim 1 further comprising a plurality of uplink demodulator systems corresponding to a number of sub-bands operating within a ground cell.

9. An uplink demodulator system for use in a processing satellite in a satellite based communications system, said uplink demodulator system comprising:
   a multichannel preamble processor operable to receive channelized data from a plurality of channelization modes, said multichannel preamble processor operable to determine a phase estimate for each channel of said channelized data;
   a multichannel phase tracker operable to receive said phase estimates from said multichannel preamble processor and operable to track a phase for each channel of said channelized data to phase align each channel of said channelized data to corresponding uplink signals;
   a first output path in communication with said multichannel phase tracker, said first output path operable to operate on heavy encoded channelized data, said first output path including an inner decoder operable to decode a portion of said heavy encoded channelized data;
   a second output path in communication with said multichannel phase tracker, said second output path operable to operate on light encoded channelized data;

a second multiplexer operable to multiplex and route said heavy encoded channelized data from said first output path and said light encoded channelized data from said second output path to a second output, wherein said multiplexed heavy encoded channelized data and said light encoded channelized data is phase aligned with said corresponding uplink signals.

10. The uplink demodulator system as defined in claim 9 wherein said plurality of channelization modes includes X mode having a single channel, Y mode having 5 channels and Z mode having 25 channels.

11. The uplink demodulator system as defined in claim 9 wherein said received channelized data from said plurality of channelization modes is time synchronized to its corresponding uplink.

12. The uplink demodulator system as defined in claim 9 wherein said first output path further includes a multichannel nibble to byte converter operable to combine nibbles of said channelized data for each channel into bytes of channelized data for each channel and said second output path includes a multichannel dibit to byte converter operable to receive dibits of said channelized data for each channel and form bytes of said channelized data for each channel.

13. The uplink demodulator system as defined in claim 9 further comprising a plurality of uplink demodulator systems corresponding to a number of sub-bands operating within a ground cell.

14. The uplink demodulator system as defined in claim 13 further comprising an outer decoder operable to decode said multiplexed heavy and light encoded channelized data from each of said uplink demodulator systems.

15. An uplink demodulator system for use in a processing satellite in a satellite based communications system, said uplink demodulator system comprising:

a multichannel preamble processor operable to receive channelized data from a plurality of channelization modes, said multichannel preamble processor operable to determine a phase estimate for each channel of said channelized data;

a multichannel phase tracker operable to receive said phase estimates from said multichannel preamble processor and operable to track a phase for each channel of said channelized data to phase align each channel of said channelized data to corresponding uplink signals;

a first output path in communication with said multichannel phase tracker, said first output path operable to operate on heavy encoded channelized data, said first output path including a multichannel nibble to byte converter operable to combine nibbles of said channelized data for each channel into bytes of channelized data for each channel; and a second output path in communication with said multichannel phase tracker, said second output path operable to operate on light encoded channelized data, said second output path including a multichannel dibit to byte converter operable to combine dibits of said channelized data for each channel into bytes of said channelized data for each channel, wherein said bytes of said heavy encoded channelized data and said bytes of said light encoded channelized data is phase aligned with said corresponding uplink signals.

16. The uplink demodulator system as defined in claim 15 wherein said first output path includes a data demultiplexing and reordering buffer operable to reorder said channelized data by channel and an inner decoder operable to decode inner encoded data present on said heavy encoded channelized data.

17. The uplink demodulator system as defined in claim 15 further comprising a plurality of uplink demodulator systems corresponding to a number of sub-bands operating within a ground cell and an outer decoder operable to decode said heavy and light encoded channelized data from each of said uplink demodulator systems.

18. The uplink demodulator system as defined in claim 15 further comprising:

a first multiplexer having a plurality of inputs and a first output, said first multiplexer operable to receive channelized data from a plurality of channelization modes at said plurality of inputs and operable to route said channelized data to said first output; and a second multiplexer operable to multiplex and route said heavy encoded channelized data from said first output path and said light encoded channelized data from said second output path to a second output.

19. The uplink demodulator system as defined in claim 15 wherein said received channelized data from said plurality of channelization modes is time synchronized to its corresponding uplink.

20. The uplink demodulator system as defined in claim 15 wherein said plurality of channelization modes includes X mode having a single channel, Y mode having 5 channels and Z mode having 25 channels.

* * * * *